United States Patent
Luo et al.

(10) Patent No.: US 9,858,713 B2
(45) Date of Patent: Jan. 2, 2018

(54) METHOD AND DEVICE FOR CONSTRUCTING GRAPH REPRESENTATION FOR A 3D OBJECT

(71) Applicant: THOMSON LICENSING, Issy les Moulineaux (FR)

(72) Inventors: Tao Luo, Rennes (FR); Kangying Cai, Rennes (FR); Jiang Tian, Beijing (CN)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 15/032,615

(22) PCT Filed: Oct. 28, 2013

(86) PCT No.: PCT/CN2013/086075
§ 371 (c)(1),
(2) Date: Apr. 27, 2016

(87) PCT Pub. No.: WO2015/061945
PCT Pub. Date: May 7, 2015

(65) Prior Publication Data
US 2016/0247315 A1    Aug. 25, 2016

(51) Int. Cl.
*G06T 15/00* (2011.01)
*G06T 17/00* (2006.01)

(52) U.S. Cl.
CPC ........ *G06T 17/005* (2013.01); *G06T 2200/04* (2013.01)

(58) Field of Classification Search
CPC ......... G06F 17/30958; G06F 17/30961; G06T 17/005; G06T 2200/00; G06T 2200/04; G06T 17/00
(Continued)

(56) References Cited

U.S. PATENT DOCUMENTS 5,747,651 A    5/1998 Lemischka
5,841,958 A    11/1998 Buss et al.
(Continued)

FOREIGN PATENT DOCUMENTS

CN    1691068       11/2005
CN    100578538     1/2010
CN    103080982 A   5/2013

OTHER PUBLICATIONS

Mao et al., "Detection and Typification of Linear Structures for Dynamic Visualization of 3D City Models", Computers, Environment and Urban Systems, vol. 36, No. 3, 2012, pp. 233-244.
(Continued)

*Primary Examiner* — Xiao Wu
*Assistant Examiner* — Sarah Lhymn
(74) *Attorney, Agent, or Firm* — Tutunjian & Bitetto, P.C.

(57) ABSTRACT

It is provided a method for constructing a graph representation for a 3D object, wherein comprising the steps of generating an initial graph representation for the 3D object, wherein a node in the initial graph representation corresponds to a component of the 3D object and a symmetric indication value uniquely identifying a symmetric group is associated with a symmetric node; selecting two nodes from one symmetric group that has the most symmetric nodes, wherein the distance between the two nodes are the largest among distance between any other two nodes within the symmetric group; obtaining two set of nodes by expanding separately from the two nodes to their directly connected nodes, wherein if a node is connected directly to both two nodes, the node is excluded from the two set of nodes; and if determining that the two sets of nodes match, updating the graph representation by grouping each set of nodes into one node.

11 Claims, 4 Drawing Sheets

(58) Field of Classification Search
USPC ........ 345/418, 419, 440, 619; 707/791, 797, 707/798, 805
See application file for complete search history.

(56) References Cited

U.S. PATENT DOCUMENTS

| | | |
|---|---|---|
| 6,714,201 B1 | 3/2004 | Grinstein et al. |
| 7,171,060 B2 | 1/2007 | Park et al. |
| 2004/0111406 A1 | 6/2004 | Udeshi et al. |
| 2013/0132442 A1* | 5/2013 | Tsatsou ............. G06F 17/30734 707/798 |

OTHER PUBLICATIONS

Nakamura et al., "3D Multimedia Data Search System Based Stochastic ARG Matching Method", 15th International Multimedia Modeling Conference, Sophia-Antipolis, France, Jan. 7, 2009, pp. 379-389.
Wu et al., "Model-Based 3-D Object Recognition", 2nd International Conference on Automation, Robotics, and Computer Vision, Singapore, Malaysia, Sep. 15, 1992, pp. 1-6.
Wang et al., "Symmetry Hierarchy of Man-Made Objects", Eurographics 2010, vol. 30, No. 2, 2011, pp. 1-10.
European Search Report for EP No. 13896217.0 dated Jun. 26, 2017 (7 pages).

\* cited by examiner

METHOD AND DEVICE FOR CONSTRUCTING GRAPH REPRESENTATION FOR A 3D OBJECT This application claims the benefit, under 35 U.S.C. §365 of International Application PCT/CN2013/086075, filed Oct. 28, 2013, which was published in accordance with PCT Article 21(2) on May 7, 2015 in English.

TECHNICAL FIELD

The present invention relates to image processing, and more particularly relates to a method and a device for constructing graph representation for a 3D object.

BACKGROUND

In 3D computer graphics, 3D modeling is the process of developing a mathematical representation of any 3D surface of object (either inanimate or living) via specialized software. The resulting product is called a 3D model, which represents a 3D object using a collection of points in 3D space, connected by various geometric entities such as triangles, lines, curved surface, etc. Being a collection of data (points and other information), 3D models can be created manually, algorithmically (procedural modeling), or scanned.

Shape understanding has been an intensive research topic in computer vision and graphics. For 3D models, it is crucial to understand the structures in many applications, such as modeling, compression, animation, editing, synthesis, etc. Generally, the high-level representation of a 3D model can capture the functionality and regularity in the organization of its components. Such a high-level representation can be depicted as a skeleton model, a tree representation or a graph model, etc.

For most of man-made 3D objects, symmetry and hierarchical structures usually exist. In previous work, the two characteristics have been combined to construct the high-level representation. In Y. Wang, K. Xu, J. Li, H. Zhang, A. Shamir, L. Liu, Z. Cheng, Y. Xiong. Symmetry Hierarchy of Man-Made Objects Computer Graphics Forum (Eurographics 2010), vol. 30, no. 2, pp. 287-296, 2011, it introduces symmetry hierarchy of man-made objects, which provides a symmetry-induced, hierarchical organization of the model's constituent parts. This work uses a 3D mesh as input and returns a tree representation, whose leaf nodes are the constituent parts of the 3D mesh and the internal nodes represent symmetry-grouping or part-assembly operations.

Although the symmetry hierarchy method performs well on the prerequisite excellent symmetry results, it is challenging to segment the input model for symmetry discovery. Due to missing data and noise, the symmetry detection sometimes generates a few false results. In addition, the high-level representation is built on the user-defined criteria, which are concluded based on observations.

SUMMARY

According to an aspect of the present invention, it is provided a method for constructing a graph representation for a 3D object, wherein comprising the steps of generating an initial graph representation for the 3D object, wherein a node in the initial graph representation corresponds to a component of the 3D object and a symmetric indication value uniquely identifying a symmetric group is associated with a symmetric node; selecting two nodes from one symmetric group that has the most symmetric nodes, wherein the distance between the two nodes are the largest among distance between any other two nodes within the symmetric group; obtaining two set of nodes by expanding separately from the two nodes to their directly connected nodes, wherein if a node is connected directly to both two nodes, the node is excluded from the two set of nodes; and if determining that the two sets of nodes match, updating the graph representation by grouping each set of nodes into one node.

According to another aspect of the present invention, it is provided a device for constructing a graph representation for a 3D object, comprising a CPU and a storage; wherein the CPU is used for generating an initial graph representation for the 3D object and storing the initial graph representation in the storage, wherein a node in the initial graph representation corresponds to a component of the 3D object and a symmetric indication value uniquely identifying a symmetric group is associated with a symmetric node; selecting two nodes from one symmetric group that has the most symmetric nodes, wherein the distance between the two nodes are the largest among distance between any other two nodes within the symmetric group; obtaining two set of nodes by expanding separately from the two nodes to their directly connected nodes, wherein if a node is connected directly to both two nodes, the node is excluded from the two set of nodes; and if determining that the two sets of nodes match, updating the graph representation by grouping each set of nodes into one node and storing the updated graph representation in the storage.

It is to be understood that more aspects and advantages of the invention will be found in the following detailed description of the present invention.

BRIEF DESCRIPTION OF THE DRAWINGS

The accompanying drawings, which are included to provide a further understanding of the invention and are incorporated in and constitute a part of this application, will be used to illustrate an embodiment of the invention, as explained by the description. The invention is not limited to the embodiment.

In the drawings.

DETAILED DESCRIPTION

The embodiment of the present invention will now be described in detail in conjunction with the drawings. In the following description, some detailed descriptions of known functions and configurations may be omitted for clarity and conciseness.

Attributed Relational Graph (ARG) is a useful model or tool for representing relational patterns in graph processing, for example, 3D model. In general, a conventional ARG consists of 4-tuple $<V,E,\alpha_V,\beta_E>$, where V denotes a set of nodes; E is a set of edges between pairs of nodes; and $\alpha_V$ and $\beta_E$ are attribute functions respectively for the nodes and edges. In the conventional ARG for representing a 3D model, the minimum unit (i.e. the node) in the ARG corresponds to a constituent component in the 3D model and edge between two nodes indicates geometric proximity between two constituent components that correspond to the two nodes. In the invention, it explores the symmetrical and geometric relationship between constituent components so as to contract the graph representation of the 3D object, which is generated by the conventional ARG. In other words, the symmetry refinement is added to the construction of high-level graph representation of ARG. The invention constructs the graph representation of a 3D model from fine to coarse level. Given any symmetry detection as input, the invention refines the symmetry results based on graph matching method meanwhile constructing the hierarchical graph representation. Herein, the invention constructs the graph representation of a 3D model, which can depict the structures inherent to the model at different levels. The node of the graph can represent not only a primitive constituent component but also a sub-graph composing of several primitive ones. As an input, the excellent quality of symmetry detection is not required. The symmetry can be refined during sub-graph matching and the hierarchical representation can be achieved through contraction of sub-graphs into new nodes.

This invention provides a method and an apparatus to generate a hierarchical graph representation representing the structure of a 3D model. Compared to conventional ARG, the node in the graph representation of the invention may represent more than one constituent components of the 3D model if the more than one constituent component meets certain conditions, which will be described below in details.

Figure 1:
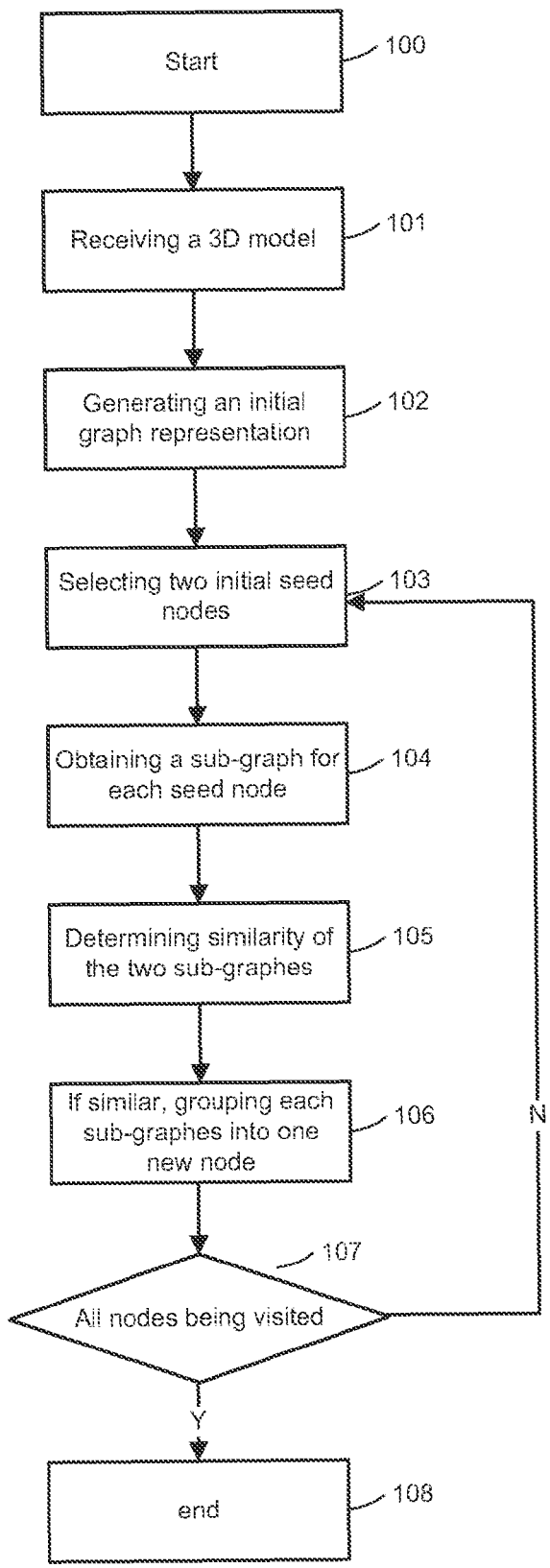
FIG. 1 is a flow chart showing a method for generating a graph representation for a 3D model according to an embodiment of the present invention.

FIG. 1 is a flow chart showing a method for generating a graph representation for a 3D model according to an embodiment of the present invention.

Figure 2:
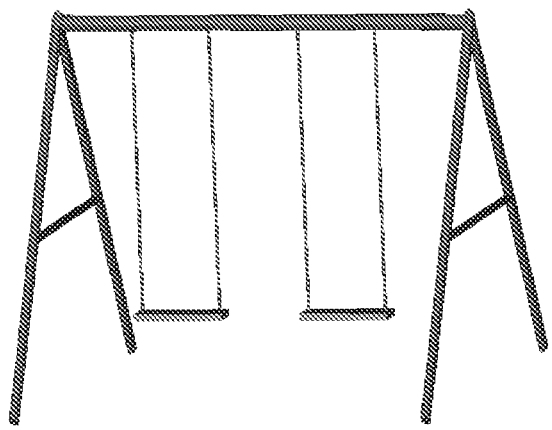
FIG. 2 is a diagram showing a 3D model for swing according to the embodiment of the present invention.
Figure 3:
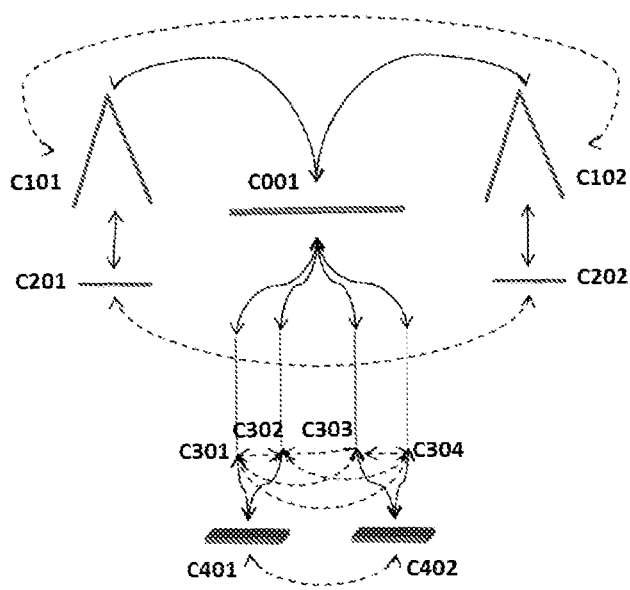
FIG. 3 is a diagram showing constituent components and symmetry information of the 3D model of the FIG. 2 according to the embodiment of the present invention.

In the step 101, a 3D model is received. By using model decomposition and symmetry detection, constituent components and symmetry information of the 3D model are obtained from the 3D model. For example, WO2012000132 discloses a method and apparatus for detecting repetitive structures in 3D mesh models. The method described therein can be used to obtain the constituent components and symmetry information. FIG. 2 is a diagram showing a 3D model for swing according to the embodiment of the present invention. In the 3D model, there are two identical swing seats hung on the swing frame, and the swing frame is symmetric. FIG. 3 is a diagram showing constituent components and symmetry information of the 3D model of the FIG. 2 according to the embodiment of the present invention, wherein solid lines indicate geometric proximity (or geometric adjacency) and dash lines indicate symmetry relationship. The reference signs (C001, C101, C102 . . . C402) are used to indicate the constituent components for the convenience of description.

Figure 4:
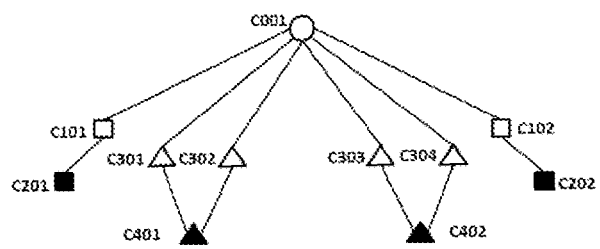
FIG. 4 is a diagram showing a graph representation of the 3D model in the FIG. 2 according to the embodiment of the present invention.

In the step 102, an ARG is generated based on the constituent components and symmetry information of the 3D model, wherein a node corresponds to one constituent component of the 3D model and an edge between two nodes indicates geometric proximity between two corresponding constituent components. Specifically, based on a set of constituent components decomposed from a 3D model and symmetry information from preliminary results of symmetry discovery, an initial graph is constructed. After that, the attributes derived from the components are associated with the nodes and edges respectively. For example, the shape descriptor (e.g. spin image) computed for each component can be taken as one type of attributes for each node. And the distance between the corresponding centroids for a pair of connected nodes can be taken as one type of attributes for each edge. (The spin image is a surface representation technique that is used for surface matching and object recognition in 3D scenes. Spin images encode the global properties of any surface in an object-oriented coordinate system. The object-oriented coordinate system is a coordinate system fixed on a 3D object.) We take the 3D model in the FIG. 2 for example. After symmetry detection, some unique components and symmetric components are detected as shown in the FIG. 3. Herein, symmetric components mean two or more identical components. Symmetry is explored among the decomposed components and the transformation is obtained between the symmetric components simultaneously. As shown in the FIG. 3, the symmetric components are included in four groups, which are (C101, C102), (C201,C202), (C301,C302,C303,C304) and (C401, C402). And the unique component is component C001. Nevertheless, it is hard to detect all existing repetitive/symmetric components and there maybe exist wrong detections. Thus, it is necessary to employ the initial results to refine the detection of symmetric components and correct the false results. FIG. 4 is a diagram showing a graph representation of the 3D model in the FIG. 2, wherein nodes of the graph correspond to the constituent components decomposed from the model; the nodes with the same pattern (e.g. square without filling, square with filling, triangle without filling and triangle with filling) are symmetric components; and the edges linking the nodes indicate the geometric proximity between the corresponding components. In terms of data structure for storage in memory (e.g. either volatile or non-volatile storing device), graph or list is used to store the ARG while for every node, additional graph data structure is defined for the contracted sub-graphs. The index number for nodes can be used to distinguish different symmetric groups.

Besides, in the embodiment of the present invention, additional information can be associated for each node, such as the category of the corresponding component (unique, symmetric) and its index, the feature vectors, the bounding box, or its constituent components (if the node represents more than one constituent components) etc. The attributes for each edge comprise measurements between the two components corresponding to the two nodes of the edge, such as the distance of the two centroids, the orientation variation of the principal axes, the ratio of the volume sizes, etc. In this invention, the attributes for the graph node include the feature descriptors for the corresponding component (e.g. spin images, and shape context), indexing number of the symmetric group (an identification number uniquely identifying a symmetric group), the bounding box, and the indexes of its constituent components (an identification number uniquely identifying a components). The feature descriptors are used, e.g. in the following step 105, to compute the geometric similarity between two sub-graphs, and refine the symmetry result. Generally, the feature descriptors are represented using the histograms and matched using a certain distance metric. And the attributes for the graph edge include the value that indicates whether the two components are connected or not in geometry, the orientation variation and the scale ratio (relative size) between the two connected nodes.

Figure 5:
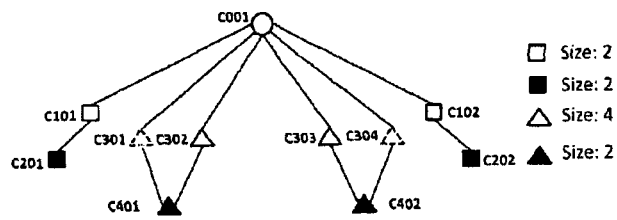
FIG. 5 is a diagram showing the size for sets according to the embodiment of the present invention.

In the step 103, two initial seed nodes are selected, wherein two nodes correspond to a same type (or called category) of constituent components; their distance is the largest among the constituent components of this type; and the number of constituent components of this type is the largest among numbers of constituent components of each types. Specifically, after the ARG graph representation is constructed for the 3D model, the initial seed nodes are selected for contraction of the graph representation. According to a variant of the embodiment, the seed nodes are selected from those nodes having symmetric information instead of all nodes. It is because that due to the quality of the input model and the performance of the algorithm for symmetry detection, the symmetric information is not always detected for each component. Thus, the initial seed nodes are not selected from these nodes without symmetric information. In the 3D model, it may have several sets of symmetric constituent components, and the size of a set indicates the number of symmetric components in the set. According to the embodiment, if a node belongs to a symmetric group it is associated with a corresponding indexing number. By using the indexing number, a symmetric group with the largest size can be determined. Then, based on the bounding box for a component corresponding to the node, the distance between any pair of nodes can be obtained by calculating the distance between the centric points of their bounding boxes. The pair of nodes with the largest distance is obtained finally. According to a variant, the distance is obtained by calculating the distance between the centroid of the two components. FIG. 5 is a diagram showing the size for sets according to the embodiment of the present invention. From the set with a largest size, two nodes with largest distance are selected as the initial seed nodes for the graph contraction. As can be seen from the FIG. 5, the number of the triangle without filling, which represents swing rope or swing chain, is the largest. Then two initial nodes are selected from the set of the triangle without filling. As shown in the FIG. 5, the two triangles without filling in dash border lines are selected as initial seed nodes because their distance is the largest. According to a variant of the present embodiment, in an extreme case, none of nodes have symmetric information. In this case, two matched components with most distance are taken as the initial seed nodes.

Figure 6:
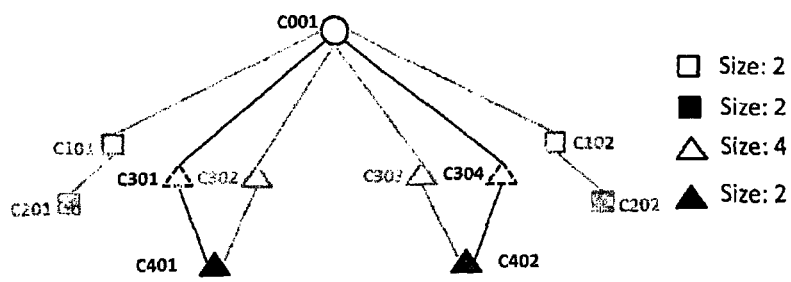
FIG. 6 is a diagram showing the one-ring neighboring nodes of the seed nodes according to the embodiment of the present invention.
Figure 7:
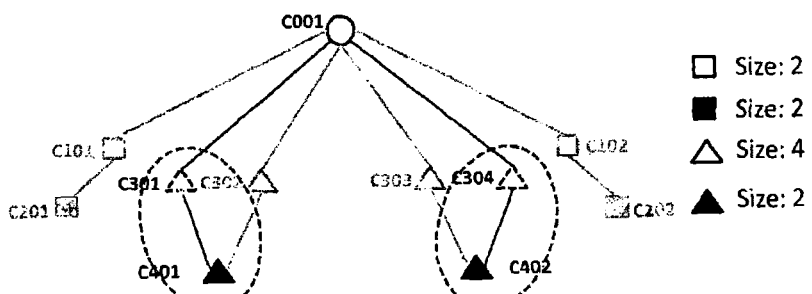
FIG. 7 a diagram showing the sub-graphs after expansion according to the embodiment of the present invention.

In the step 104, for each selected seed node, a sub-graph is obtained by expanding from the selected seed node to its one-ring neighborhood nodes, wherein if a node is one-ring neighborhood node for both two selected nodes, it is excluded from the sub-graphs of the two selected seed nodes. As to one-ring neighborhood, it is defined as a set of nodes connected directly with the selected seed node by edges. Take node C301 in the FIG. 6 for example, its one-ring neighborhood consists of the node C001 and C401. The one-ring neighborhood of a node are stored in the data structure, which can be obtained by visiting each node of interest. Herein, each sub-graph corresponds to a set of nodes comprising a selected node, its one-ring neighborhood node(s) and their edges. Specifically, to contract the attributed relational graph, sub-graphs are obtained by expanding from the initial seed nodes. As shown in the FIG. 6, the nodes C001, C401 and C402 are the one-ring neighborhood nodes of the selected seed nodes C301 and C304, which are sorted according to their ascending distances included in the attributes of edges. For example, the seed node C301 has two one-ring neighborhoods, C001 and C401. And the distances between the seed node and its neighboring node have been stored in the attributes of the corresponding edges. The nodes C001 and C401 are sorted according to the ascending distances from the seed node C301. Here, the distance between two nodes can be computed using the distance between the two centroids of corresponding components. Other measurements can also be utilized to determine the priority of the neighboring nodes during the sub-graph expansion. And the neighboring nodes shared by the two seed nodes are rejected to be used, such as the node C001. Thus, the node C401 is selected to expand the sub-graph derived from the node C301. The FIG. 7 shows the sub-graphs after expansion, wherein the sub-graphs in the dash lines are the expanded sub-graphs from the seed nodes.

In the step 105, the earth mover's distance (EMD) is used to measure similarity of the two sub-graphs. Specifically, the matching between two sub-graphs is implemented based on earth mover's distance. The Earth Mover's Distance (EMD) (as introduced in Y. Rubner, C. Tomasi, L. J. Guibas. The Earth Mover's Distance as A Metric for Image Retrieval. International Journal of Computer Vision, vol. 40, no. 2, pp. 99-121, 2000) computes the distance between two distributions, which are represented by signatures. The signatures are sets of weighted features that capture the distributions. The features can be of any type and in any number of dimensions. The EMD is defined as the minimum amount of work needed to change one signature into the other. The notion of work is based on the distance between two features. Taking the sub-graphs in the FIG. 7 for example, because the initial seed nodes are matched, they are fixed to be corresponding nodes during graph matching. And then based on EMD, the other nodes are evaluated whether or not they are matched. Here the features on each node and the distance definition can be selected interactively. Specifically, in order to measure the similarity between two components, the appropriate feature descriptors and the distance measurements are selected by users according to the category of data. In general, the features for each node are represented as a histogram. Besides earth mover's distance, the users can choose alternative measurements to measure the similarity.

Figure 8:
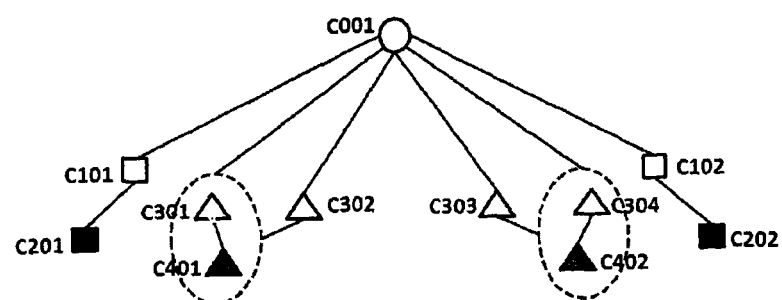
FIG. 8 is a diagram showing new nodes after contraction according to the embodiment of the present invention.

In the step 106, if result of measurement indicates that the two sub-graphs match, the nodes in the sub-graphs are grouped into one node in a new graph representation of the 3D object. And correspondingly, the graph representation of ARG is updated. Specifically, after the sub-graphs expanded from one-ring neighborhood are detected to be matched, the correspondence between nodes is employed to update the attributes about symmetry on the nodes. The symmetric information associated with the node can be corrected or assigned. If the original value about symmetry in the node attributes is null, it is assigned as an index number after the symmetric node is found. And due to the mistakes in initial symmetry detection, the initial index number of symmetric group can be corrected in this step. And the matched sets of nodes can be grouped into one node as shown in the FIG. 8. Then the ARG is updated with the new merged nodes, which represent sub-graphs. During the process of grouping the sub-graphs into new ones, the nodes and edges in each sub-graph are deleted in the previous graph data-structure and a new node is created. The new edges connected to the new node are added according to the connectivity between the constituent nodes of the sub-graphs and the remaining nodes. Furthermore, the new attributes are updated using the geometric data represented by the sub-graphs for the new nodes and edges. And the indexes of components for each sun-graph are added into the attributes of the new node. According to a variant of the present embodiment, if there are no matched nodes from the sub-graphs of the seed nodes, attributes of the edges are used to determine whether the neighboring nodes and the seed nodes can be grouped. For example, if the relative size between the seed node and a neighboring node is very large and the orientation variation is small, the seed node and the neighboring node are considered to belong to the same meaningful part at a coarse level, and therefore the seed node and the neighboring are grouped into one node. The relative size, which is one of the edge attributes, is the scale ratio between the two connected nodes, which can be calculated as the ratio between the diagonal lengths of the corresponding two bounding boxes. Herein, the bounding box is the smallest measuring area (e.g. a rectangle cubic) containing a constituent component. And the orientation variation is also one of the edge attributes, which is computed as the difference between the principal axes for the two nodes.

Figure 9:
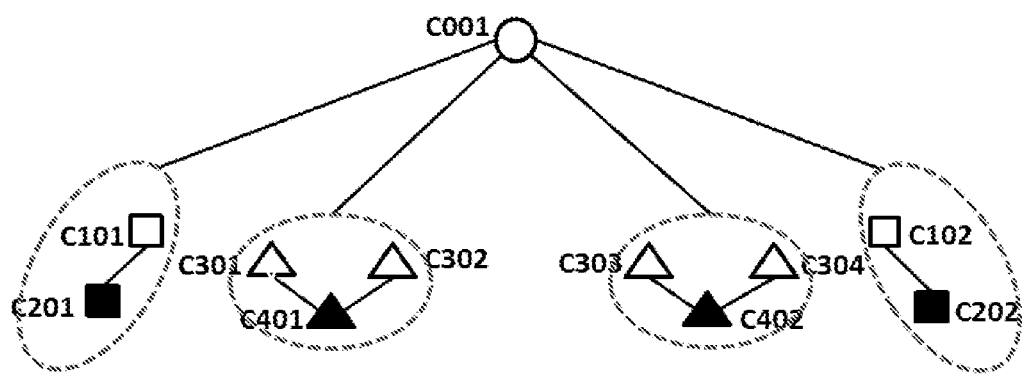
FIG. 9 is a diagram showing the final graph representation for the 3D model according to the embodiment of the present invention.

After the graph contraction, the steps 103 to 106 are repeated for the updated ARG until all nodes are visited. FIG. 9 is a diagram showing the final graph representation for the 3D model, wherein in the final graph representation, a node denoted by the dash-line circle includes 3 nodes of the initial graph representation.

According to another embodiment of the present invention, it is provided a device for constructing graph representation for a 3D object. The device comprises a Central Processing Unit (CPU), a volatile storage and a non-volatile storage, a Graphic Processing Unit (GPU) and a display for displaying data. Herein, the volatile storage is used to store temporary or intermediate data and the non-volatile storage is used to store the resulting data. In the present embodiment, the volatile storage is used to store data relating to initial graph representation and so on while the non-volatile storage is used to store the resulting graph representation for the 3D object. Besides, the GPU and the display are used to display the resulting graph representation.

Specifically, the CPU is used for 1) generating an initial graph representation for the 3D object and storing the initial graph representation in the volatile storage, wherein a node in the initial graph representation corresponds to a component of the 3D object and a symmetric indication value uniquely identifying a symmetric group is associated with a symmetric node; 2) selecting two nodes from one symmetric group that has the most symmetric nodes, wherein the distance between the two nodes are the largest among distance between any other two nodes within the symmetric group; 3) obtaining two set of nodes by expanding separately from the two nodes to their directly connected nodes, wherein if a node is connected directly to both two nodes, the node is excluded from the two set of nodes; and 4) if determining that the two sets of nodes match, updating the graph representation by grouping each set of nodes into one node and storing the updated graph representation in the volatile storage.

The CPU is further used for repeating the steps of selecting, obtaining and updating until all nodes in the initial graph representation are visited so as to generate the resulting or final graph representation and storing the final graph representation in the non-volatile storage.

The CPU is further used for receiving the 3D object; and determining components of the 3D object and symmetry information among components; wherein The CPU generates the initial graph representation based on the determined components and the symmetry information.

The CPU is further used for calculating distance between centroid of all combination of two nodes of the same symmetric group that has the most symmetric nodes.

The CPU is further used for associating an edge of two nodes with information about relative size and orientation variation between two components corresponding to the two nodes during the step of generating; and during the step of determining match, if the information associated with the nodes of the two sub-graphs is similar under a distance metric, determining the two seed nodes and their two corresponding neighboring nodes match. Otherwise, if the information associated with the edge indicates the relative size is above a value and the orientation variation is below a value, determining the seed node and its corresponding neighboring node group together.

The CPU is further used for after determining that the two sets of nodes match, if a symmetric node is associated with a wrong symmetric indication value or not associated with a symmetric indication value, assigning a correct symmetric indication value to the symmetric node.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention as defined by the appended claims.

The invention claimed is:

1. A method for constructing a graph representation for a 3D object, comprising:
    generating an initial graph representation of the 3D object, wherein the initial graph presentation has a first set of nodes and at least one edge, each node of the first set of nodes in the initial graph representation corresponds to a component of the 3D object, and each symmetric node in the first set of nodes is associated with a symmetric indication value identifying a symmetric group;
    selecting a symmetric group that has most symmetric nodes;
    selecting two nodes from the symmetric group, wherein a distance between the two nodes is the largest;
    obtaining a second and third set of nodes by expanding separately from the two nodes to their directly connected nodes, wherein if a node is connected directly to both two nodes, the node is excluded from the second and third sets of nodes; and
    if determining that the second and third sets of nodes match, updating the graph representation by grouping the second and third sets of nodes into one node.

2. The method of claim 1, further comprising repeating the selecting for the symmetric group, selecting for the two nodes, and obtaining and updating until all nodes in the initial graph representation are visited.

3. The method of the claim 1, further comprising: receiving the 3D object; and determining components of the 3D object and symmetry information among components;

wherein the generating further comprises generating the initial graph representation based on the determined components and the symmetry information.

4. The method of the claim 1, further comprising calculating a distance between centroids of all combination of two nodes of the same symmetric group that has the most symmetric nodes.

5. The method of the claim 1, further comprising: associating an edge of two nodes with information about relative size and orientation variation between two components corresponding to the two nodes during the generating; and if determining that the second and third sets of nodes don't match and the information associated with the edge indicates that the relative size is above a value and the orientation variation is below a value, grouping the selected two nodes on the ends of the edge into one node.

6. The method of the claim 1, further comprising after determining that the second and third sets of nodes match, if a symmetric node is associated with a wrong symmetric indication value or not associated with a symmetric indication value, assigning a correct symmetric indication value to the symmetric node.

7. A device for constructing a graph representation for a 3D object, comprising a CPU and a storage; wherein the CPU is used for generating an initial graph representation of the 3D object and storing the initial graph representation in the storage, wherein the initial graph presentation has a first set of nodes and at least one edge, each node of the first set of nodes in the initial graph representation corresponds to a component of the 3D object, wherein the at least two nodes comprises at least one symmetric node, and each symmetric node in the first set of nodes is associated with a symmetric indication value identifying a symmetric group, and a symmetric group is associated with a symmetric node;

selecting a symmetric group that has most symmetric nodes;

selecting second and third sets of nodes from the symmetric group, wherein a distance between the two nodes is the largest;

obtaining the second and third sets of nodes by expanding separately from the two nodes to their directly connected nodes, wherein if a node is connected directly to both two nodes, the node is excluded from the second and third sets of nodes; and if determining that the second and third sets of nodes match, updating the graph representation by grouping the second and third sets of nodes into one node and storing the updated graph representation in the storage.

8. The device of claim 7, wherein the CPU is further used for repeating the steps of selecting for the symmetric group, selecting for the two nodes, and the obtaining and updating until all nodes in the initial graph representation are visited.

9. The device of the claim 7, wherein the CPU is further used for calculating distance between centroids of all combination of two nodes of the same symmetric group that has the most symmetric nodes.

10. The device of the claim 7, wherein the CPU is further used for associating an edge of two nodes with information about relative size and orientation variation between two components corresponding to the two nodes during the generating; and if determining that the second and third sets of nodes don't match and the information associated with the edge indicates that the relative size is above a value and the orientation variation is below a value, grouping the two nodes on the ends of the edge into one node.

11. The device of the claim 7, wherein the CPU is further used for after determining that the second and third sets of nodes match, if a symmetric node is associated with a wrong symmetric indication value or not associated with a symmetric indication value, assigning a correct symmetric indication value to the symmetric node.

* * * * *